United States Patent [19]

Maillard et al.

[11] Patent Number: 5,170,060
[45] Date of Patent: Dec. 8, 1992

[54] MEASURING THE FLOW RATE OF A THIN STREAM OF MOLTEN MATERIAL

[75] Inventors: Alain Maillard, Soisy sous Montmorency; Jean Peyre, Garches, both of France

[73] Assignee: Isover Saint-Gobain, Courbevoie, France

[21] Appl. No.: 770,935

[22] Filed: Oct. 4, 1991

[30] Foreign Application Priority Data

Oct. 4, 1990 [FR] France ................ 90 12227

[51] Int. Cl.$^5$ .......................................... G01N 21/86
[52] U.S. Cl. ................................ 250/560; 250/573; 356/28
[58] Field of Search ............ 250/560, 573, 574, 575, 250/338.5, 356.1; 356/441, 442, 436, 434, 28, 376, 381, 384, 385

[56] References Cited

U.S. PATENT DOCUMENTS 4,485,309 11/1984 Johansson et al. ............ 356/379
4,673,289 6/1987 Gaucher ............................ 356/72

FOREIGN PATENT DOCUMENTS 0100304 2/1984 European Pat. Off.
572623 2/1976 Switzerland.
2091418 7/1982 United Kingdom.

Primary Examiner—David C. Nelms
Assistant Examiner—K. Shami
Attorney, Agent, or Firm—Oblon, Spivak, McClelland, Maier & Neustadt

[57] ABSTRACT

For measuring the flow rate of a thin stream of molten materials such as that of glass, the diameter of the thin stream is measured, as is the velocity. The velocity is measured on the basis of the measurement of the time separating the successive appearance of an emission sequence emitted at first and second points on the path of the molten material. A correlation is then established between the sequences and the time interval corresponding to the passage of the same irregularities at the two selected points identified by this correlation.

7 Claims, 2 Drawing Sheets

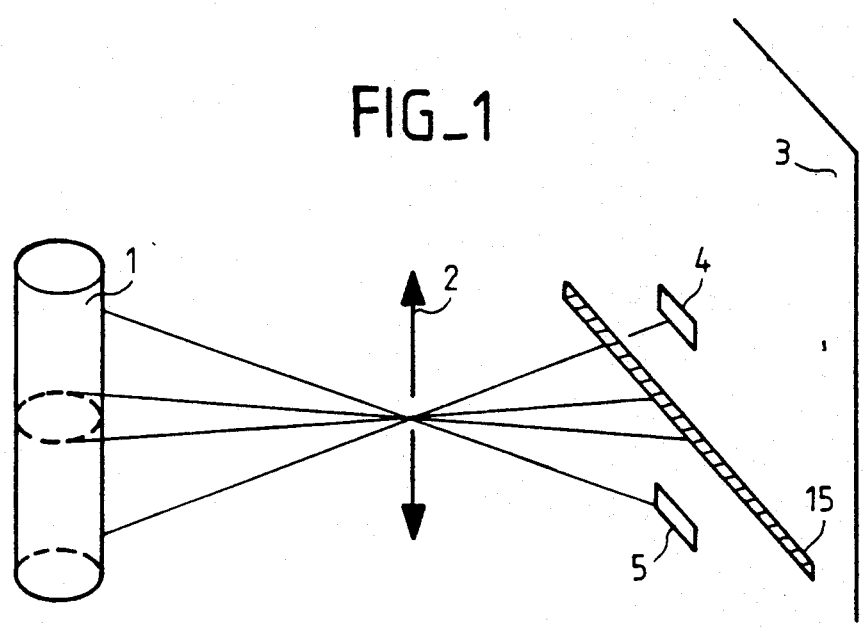
FIG_1
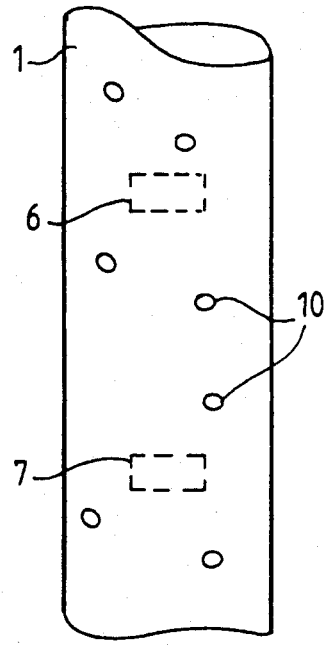
FIG_2-a
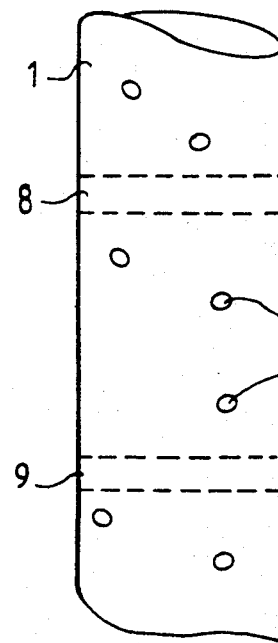
FIG_2-b
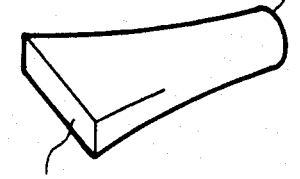
FIG_2-c
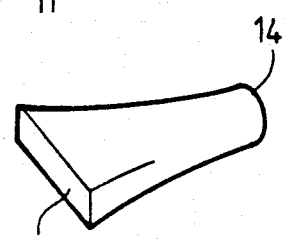
FIG_2-d

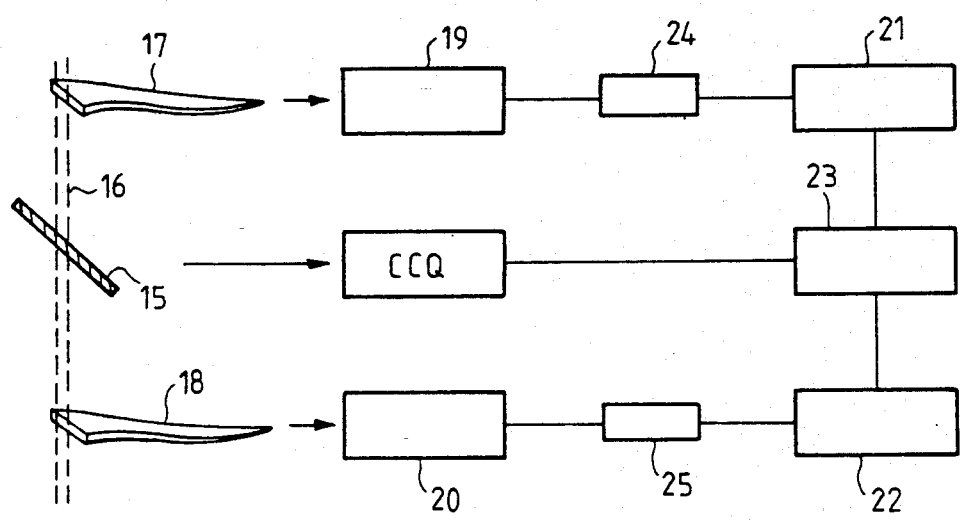
FIG_3
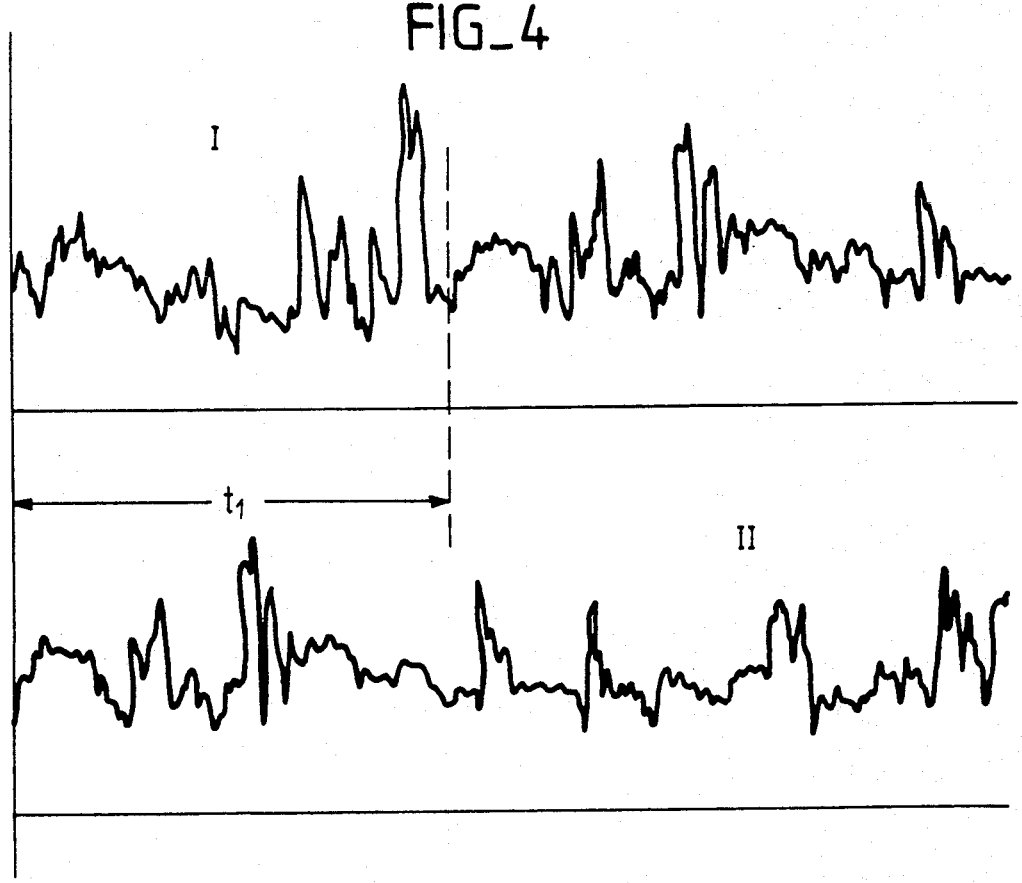
FIG_4

5,170,060

MEASURING THE FLOW RATE OF A THIN STREAM OF MOLTEN MATERIAL

BACKGROUND OF THE INVENTION

1. Field of the Invention

The invention relates to the improvement of techniques for measuring the flow rate of a thin stream of molten materials such as that of glass, basalts, slag, ceramics and the like, which materials in the molten state are the source of the emission of large-scale radiation.

2. Description of the Related Art

It is known to measure these flow rates by means described in particular in patent SE 82 03650. According to this document, the measuring principle is as follows: two sensors, sensitive to the radiation emitted, are disposed on the path followed by the molten material at a distance from one another. There are irregularities in the emission of the molten material. The sensors are disposed so as to receive the emission from a limited portion of the section of the thin stream in question. The signals received are selected so as to retain only those signals which exceed a given threshold. The conventional technique consists in measuring the time separating the appearance of signals exceeding he threshold on each of the sensors, the measurement being translated into the flow velocity of the material. Measurement of the diameter of the thin stream completes the determination process enabling the flow rate to be attained. The diameter is measured by forming the image of the cross-section of the thin stream on a linear camera and determining the number of radiation sensitive elements of the camera receiving sufficient radiation as corresponding to the width of the thin stream in question.

The arrangements provided in the prior art technique only fulfills the intended aim to a limited extent. In practice, the flow rate measurements are principally used in the control of a regulating die or orifice. The measurements are compared with reference values selected by the operator and any difference relative to these reference values triggers an adjustment of the parameters such as the electrical power supply and consequently the temperature of the die from which the material flows freely. In other words, the flow rate in this type of application has to be measured precisely and continuously since otherwise the system would be totally disorganized.

It is possible to avoid incorrect measurements affecting the regulation process by excluding any measurement which would differ from a high probability variation range defined experimentally. However, this technique is not entirely satisfactory since it results in a systematic loss of data.

The presence of deviant measurements is inherent in the system previously described which is based on the consecutive recognition of two signals exceeding a given threshold by the two sensors. In a system of this type, the identification of the signals cannot be perfect, even if other "safety devices" (in particular those regarding the time separating two signals) enable certain risks of errors to be eliminated.

SUMMARY OF THE INVENTION

An object of the present invention is to improve the techniques used for measuring the flow rates of molten material of the types indicated above, in particular by minimizing or eliminating the risks of errors in the identification of the signals used to determine the rate of flow.

In accordance with the invention and as stated above, the measurement of the flow is based on the variations in radiation from the thin stream of molten material, which variations are followed by two sensors disposed along the path of the flow. The difficulties noted previously are avoided by not plotting the "peaks" corresponding to irregularities of a given size—which moreover constitutes a limit of use if the thin stream in question does not have any irregularities or has insufficient irregularities—but by comparing all the signals received by the two successive sensors. In accordance with the invention it is no longer a matter, as it were, of comparing a momentary peak but a complete sequence corresponding to a certain lapse in flow time. The comparison of the complete signals from the two sensors enables a determination of the most similar or the best correlated sequences and, once these have been identified, a deduction therefrom of the time lapsed between the two sensing processes.

Tests have shown that even taking into account inevitable modifications in the physiognomy of emission sequences over time, a practically certain correlation could be established via these means, thus avoiding any erroneous measurement.

Likewise, the method of detection used according to the invention has been improved. It has been noted above that only some of the cross-section of the thin stream of molten material was conventionally used as the emission source. One reason for this choice was the necessity of minimizing the causes of variations in the radiation observed and consequently of the signals analyzed. By centering the observation on the median cross-section, the risks of large variations which show up at the edges in relation to the surrounding area are avoided. This selection is nevertheless manifested by a depletion of the available information.

Conversely, in accordance with the invention, it is possible and even preferable to process a signal which is as "rich" as possible. The more complex the signal, the more definite the correlation. For this reason, sensors enabling the radiation emitted by a complete section of the thin stream of molten materials are advantageously used.

BRIEF DESCRIPTION OF THE DRAWINGS

A more complete appreciation of the many of the attendant advantages thereof will be readily obtained as the same becomes better understood by reference to the fpllowing detailed description when considered in connection with the accompanying drawings, wherein:

FIG. 1 is a schematic diagram of the technique used;

FIGS. 2a and 2b show schematically the parts of the thin stream of material observed according to the prior art and according to the invention respectively;

FIGS. 2c and 2d show examples of optical wave guides according to the invention;

FIG. 3 is a schematic diagram of the measuring assembly; and

FIG. 4 is a diagram showing a comparison of the signals from the means detecting emission irregularities.

DETAILED DESCRIPTION OF THE PREFERRED EMBODIMENTS

In FIG. 1 the thin stream of molten material is represented by the cylinder segment 1. A flow of this type is found in numerous applications, in particular in the glass making and ceramics industries. By way of example, the various methods of conversion leading to the production of insulating mineral fibers use a flow of this type between the melting area and the conversion area, whether the conversion technique used is centrifuging by means of a rotor which simultaneously acts as a die or external centrifuging from the periphery of a series of wheels.

In the aforementioned examples, the molten material, glass, basalt, slag etc., flows freely over a given distance in the form of a thin stream of cylindrical cross-section. It is at a high temperature and so is the source of intense radiation. Still referring to these examples, the thin stream of molten material has a relatively large number of irregularities consisting almost exclusively of gas bubbles. Other irregularities may result from unmelted particles or particles which are insufficiently melted. In all cases, these irregularities give rise to variations in the radiation which may be detected.

The radiation emitted by the thin stream of molten material 1 is passed through an optical system represented symbolically at 2. In the image plane 3 there are located the detectors which are used to measure the flow rate. These detectors are respectively:

—two photodetectors 4 and 5 which are used to analyze the radiation emitted from two zones. The photodetectors 4 and 5 are at first and second points spaced at a distance from one another along the length of the thin stream 1;

—a detection system of the so-called "CCD" (Charged Coupled Device) linear camera type having an aligned row 15 of light sensitive cells. Accuracy of measurement depends on the resolution capacity of the camera and thus on the number of aligned cells.

FIGS. 2a and 2b show comparatively the observation ranges of the thin stream 1 of molten material in the conventional art and according to an embodiment of the invention.

In each of the two methods, the zones observed (6 and 7, 8 and 9) are respectively spaced along the path of the stream. The defects which give rise to irregularities are represented by bubbles 10.

The defects 10 are distributed in a random manner through the thin stream. This special feature alone explains one difficulty which illustrates the inaccuracy of the conventional techniques. It can be seen in FIG. 2a that some of the defects are not detected since they do not fall within observed zones 6 and 7. The richness of the signals is thus reduced thereby. Moreover, certain defects located at the lateral limits of the zones under observation may be perceived as they pass out of one of the zones but not into the other, owing to even a very small variation in the relative lateral position of the thin stream or the defect in this thin stream.

According to the invention, for the reasons indicated above, as shown in FIG. 2b it is preferable to observe complete sections of the thin stream. In practice, for thin streams supplying insulating fiber production installations, the cross-section is of the order of 0.5 to 3 cm and observation of the entire section does not give rise to any particular problems.

Sections 8 and 9 are elongate or oblong but conventional sensors are not. It is therefore convenient to modify or convert the image to be analyzed. This method of conversion is advantageously performed using an optical wave guide comprising a fiber bundle which, at the end turned towards the thin stream, has a highly elongate section 11, 12 and, at the opposite end a circular cross-section 13, 14. Thus, each of the photodetectors 4 and 5 shown in FIG. 1, and the individual cells 15 of the CCD is formed by the elongate section 11, 12 of a fiber bundle which transmits light to a remote electronic sensor portion connected to the circular section end 13, 14.

Apart from the analysis of the cross-section with a geometrical shape better adapted to the requirements of the measuring process in question, the use of an optical wave guide also has the advantage of enabling the electronic portion of the photodetectors to be located at a given distance from the exposed zones of the fiber production installation. Even if certain precautions are taken, it is in effect difficult to avoid an increase in the temperature of the device when it is located in the vicinity of the means distributing the molten material in industrial installations. It is thus advantageous to be able to locate the fragile instruments at a given distance. Maintaining the "electronic" section of the measuring device distance from the hot stream is also advantageous when the production installation comprises means for heating by induction, which generates electrical interference. A further advantage of using wave guides is, if necessary, being able to analyze the cross-sections of the thin stream located at points where the space available would not enable electronic detectors to be installed in the immediate vicinity.

The data processing assembly is illustrated schematically in FIG. 3.

On the left hand side of the Figure there are illustrated the image 16 of the thin stream, the camera cells 15 and wave guides 17 and 18.

The radiation intensity received by these wave guides is led to photodiodes 19, 20. The signals are subsequently amplified and guided, after passing through an analog/digital convertor 21, 22 to a central processing unit 23. Filters 24, 25 may be introduced in a conventional manner to eliminate interfering frequencies.

The diameter is measured by means of the cells 15 of the linear camera and the signal is also converted and sent to the central processing unit (CPU) 23.

FIG. 4, shows the type of analog signals corresponding to a measuring process. The two diagrams I and II respectively originate from the two photodiodes. By use of these diagrams the positions of identical recorded profiles can be correlated in the CPU 23 by offsetting the curve II relative to the curve I at an offset interval determined by analysis of the entire signal profile, and not merely peaks. For example, matching portions of the sequences I and II are identified and the fine interval separating the matching portions is determined. A very accurate correlation is thus possible. The offset interval corresponds to the time $t_1$ separating the passage of a given stream segment in front of the two sensors.

Such correlation by the CPU 23 yields an automatic determination of the time interval $t_1$ separating the two analog sequences observed by the two sensors. Knowledge of this time, together with that of the distance separating the two zones observation, enables a determination by the CPU 23 of the flow velocity of the thin stream of molten material to be established. The CPU 23 can then use the stream velocity and the measured diameter of the stream to determine the rate of flow.

The determination of the diameter of the flow should take account of the variation in luminance of the molten material. The width of the signal from the camera depends on the luminance. If a characteristic threshold of an "illuminated" pixel is determined, thin streams of the same diameter and different degrees of luminance will appear to have different diameters.

In order to avoid this systematic error, efforts are made to operate at a constant signal amplitude. In accordance with the invention, this is achieved by making the camera exposure time dependent on the average luminance of the thin stream. This dependency is achieved by means of camera management software having an algorithm which causes a signal to be obtained of which the amplitude is just below the maximum output level of the camera and the benefit of all its dynamics to be gained. The signal amplitude may vary owing to the fact that the exposure time progresses in a step-wise manner. The quality of the measurement is likewise improved by rendering the threshold values used to measure the width of the signal dependent on the maximum amplitude of the signal. The measurement is taken half-way up the signal.

Apart from the accuracy of measurement in dependence on the luminance, the process should also be performed such that differences between the position of the thin stream or its image opposite the camera does not interfere with the measuring procedure. The sensor should be sufficiently large in order to take account of lateral changes of limited size. In practice, when used in machines producing mineral fibers, it is chosen for example to proceed such that the image of the thin stream does not cover more than 60% of the width of the sensor. Nevertheless, for a given sensor, it is preferable if the image measured is a large part of the sensitive width so as to maintain satisfactory resolution and consequently a good degree of accuracy.

Examples

Tests using these measuring techniques have been carried out in insulating fiber production installations. Two series of tests have been carried out: the first test was performed on a glass wool production installation and the second on a rock wool installation (basalt or blast furnace slag).

In the production of glass wool, the molten material comes from a continuously operating melting oven. After being routed through a fore-hearth the material is delivered to the centrifuger by a die of which the temperature (and consequently the flow rate) is adjustable. In an installation of this type, the molten glass has an emission spectrum which is generally very rich owing to a limited refining process, resulting in the presence of a large quantity of bubbles.

In the tests conducted at a flow rate varying between 10 and 30 tonnes per day, i.e., 400 to 12,000 kg/h, the degree of accuracy achieved according to the invention is of the order of 0.3% or less in the arrangement indicated above.

It should be stressed that in this calculation the relative degree of accuracy of the measurements of the flow velocity and of the diameter of the thin stream are of the same order of magnitude. In addition, an additional gain in accuracy in measuring would be of limited consequence for the regulating capacities of the installation.

In the installation, the sections observed by the sensors for measuring the velocities are 50 mm apart in the flow direction and the velocity of the thin stream is of the order of 2 m/s. The time between each measuring cycle is of the order of a few seconds but may be reduced if necessary. Experience has shown, however, that at steady state operation the variations in flow rate occur very slowly and that a shorted measurement interval would have not effect on the regulating capacities in view of the thermal inertia of the system.

In the tests carried out, the complete sampling time corresponding to each sampling was approximately 2 seconds. The average was then calculated over approximately 10 measurements, further reducing the risk of errors.

The diameter was measured by means of a linear camera comprising 1728 pixels for stream image diameters which usually do not exceed 10 mm, enabling the diameter to be measured with a degree of accuracy of the order of 1 micrometer by calculating the average of the successive measurements. The degree of accuracy may be increased by increasing the number of pixels of the camera. In practice, however, this is not necessary when the measurements are not averaged, especially since the speed of acquisition can be increased to enable a very high number of measurements in a very short amount of time (of the order of approximately 100 per second) to be achieved. Consequently, for this measurement the interval of time between two successive measurements is also maintained at less than 5 seconds.

In the rock wool production installation the measurement is performed under similar conditions. The advantage of this measurement is all the more marked in that the method of supplying the molten material is usually much less stable than in the previous case owing to the fact that "cupola furnaces" are used to melt the raw materials.

Furthermore, a particular difficulty of molten slag and rocks is due to the fact that, unlike glass, which at melting temperature remains semi-transparent, these materials are opaque. In other words, although with glass it is possible to detect irregularities in the emission coming from the interior of the flowing thin stream, this is not possible in the case of rocks and slag. The only emission which can be analyzed is that which comes from the surface of the stream. For this reason it is also advantageous to proceed according to the method proposed by the invention which consists in analyzing a complete section of the thin stream of material.

For the measurement carried out on the rock wool production installation, the distance separating the two detection points was reduced to approximately 25 mm for practical reasons connected with the geometry of the assembly. The degree of precision obtained with the flow velocity (which remained at the order of 1 to 2 m/s) is nevertheless approximately of the same order as that of the measurement carried out on molten glass.

Despite the lateral stability of the thin stream of molten material being very approximate, it was possible to measure the diameter with the same degree of accuracy as before in the case of glass. Overall, the flow rate is obtained with a relative error which does not exceed 0.5% for flow rates ranging from 5 to 25 tonnes per day.

Obviously, numerous modifications and variations of the present invention are possible in light of the above teachings. It is therefore to be understood that within the scope of the appended claims, the invention may be practices otherwise than as specifically described herein.

What is claimed as new and desired to be secured by letters patent of the United States is:

1. Process for determining the flow rate of a thin molten stream of a radiation emitting material, comprising the steps of:
    measuring the diameter of the stream;

determining a first emission sequence at a first point along the path of the stream;

determining a second emission sequence at a second point along the path of the stream, said second point being spaced from said first point;

correlating said first and second sequences by identifying matching portions of said first and second sequences and determining a time separating said matching portions, thereby determining a time interval for an irregularity in the stream to pass from said first point to said second point;

determining the velocity of the stream as a function of said time interval and the distance between said first and second points; and determining the flow rate of the stream as a function of said velocity and said stream diameter.

2. Process according to claim 1, wherein said diameter measuring step and said first and second emission sequence determining steps each comprise observing said stream across its entire width.

3. Process according to claim 1, wherein the diameter measuring step comprises measuring by means of a linear camera receiving the image of the stream, and controlling the operation of the camera so as to render the sequenced exposure time dependent on the average luminance of the thin material stream.

4. Process according to claim 3, in which the diameter measuring step uses a threshold to determine the width of the signal, said threshold being dependent on the maximum amplitude of the signal.

5. Device for performing the process for measuring the flow rate of a thin material stream according to claim 1, comprising:

two photodetectors disposed so as to receive the emission from the thin stream corresponding to said two points;

means for amplifying the signal emitted by each of the photodetectors;

means for processing the amplified signals, correlating the signal sequences and measuring the time interval; and a linear camera positioned for determining the diameter of the thin stream.

6. Device according to claim 5, including optical wave guides for leading the image of the thin stream to the photodetectors.

7. Device according to claim 6, in which the optical wave guides have, at an end facing the thin material stream, a cross-section elongated in the direction of the width of the thin stream.

* * * * *